United States Patent
Hsueh

(10) Patent No.: US 8,411,345 B2
(45) Date of Patent: Apr. 2, 2013

(54) SHUTTER DEVICE WITH MULTI-STAGE DIAPHRAGM

(75) Inventor: Chun-Yu Hsueh, Taichung (TW)

(73) Assignee: Asia Optical International Ltd., Tortola (VG)

( * ) Notice: Subject to any disclaimer, the term of this patent is extended or adjusted under 35 U.S.C. 154(b) by 466 days.

(21) Appl. No.: 12/762,418

(22) Filed: Apr. 19, 2010

(65) Prior Publication Data

US 2010/0277784 A1 Nov. 4, 2010

(30) Foreign Application Priority Data

May 1, 2009 (TW) .............................. 98114624 A

(51) Int. Cl.
*G02B 26/02* (2006.01)

(52) U.S. Cl. .......................... 359/234; 359/230; 396/510

(58) Field of Classification Search .................. 359/227, 359/230, 234–236; 396/452, 459, 464, 493, 396/495–497, 501, 510

See application file for complete search history.

(56) References Cited

U.S. PATENT DOCUMENTS 7,699,546 B2 * 4/2010 Osoniwa et al. .............. 396/510

FOREIGN PATENT DOCUMENTS

| TW | I237158 | 8/2005 |
|---|---|---|
| TW | 200734787 | 9/2007 |
| TW | 200734807 | 9/2007 |
| TW | 200834808 | 8/2008 |

OTHER PUBLICATIONS

English abstract of TWI237158, pub. Aug. 1, 2005.
English abstract of TW200734807, pub. Sep. 16, 2007.
English abstract of TW200834808, pub. Aug. 16, 2008.
English abstract of TW200734787, pub. Sep. 16, 2007.

* cited by examiner

*Primary Examiner* — James Phan
(74) *Attorney, Agent, or Firm* — McClure, Qualey & Rodack, LLP

(57) ABSTRACT

A shutter device with a multi-stage diaphragm includes a base, a shutter unit pivoted on the base, a driving unit, and an actuator unit. The base includes a first optical opening defining an optical axle passing through the first optical opening. The shutter unit is adjusted to cover the first optical opening. The driving unit includes a main axle perpendicular to the optical axle and installed on the base, and a driving bar moving along the main axle and linking to the shutter unit. The actuator unit includes a coil board installed on one of the base and the driving bar, and an actuator magnet installed on the other of the base and the driving bar corresponding to the coil board. The coil board receives signals to change the relative position between the coil with pattern and the actuator magnet, whereby the actuator unit drives the shutter unit in multi-stages.

10 Claims, 9 Drawing Sheets

SHUTTER DEVICE WITH MULTI-STAGE DIAPHRAGM

CROSS REFERENCE TO RELATED APPLICATIONS

This Application claims priority of Taiwan Patent Application No. 098114624, filed on May 1, 2009, the entirety of which is incorporated by reference herein.

BACKGROUND OF THE INVENTION

1. Field of the Invention

The present invention relates to a shutter device, and more particularly, to a shutter device with a multi-stage diaphragm.

2. Description of the Related Art

A conventional shutter device usually utilizes a motor or an electromagnetic valve to control a shutter and a diaphragm thereof. For example Taiwan Patent No. 1237158 discloses two electromagnetic valves. One of the electromagnetic valves control opening and closing of the shutter. The other controls switching a large diaphragm and a small diaphragm. Thus, the conventional shutter device has many elements. Meanwhile, if we use the electromagnetic valve to control the diaphragm, the diaphragm has only two stages for switching. If the diaphragm must be adjusted by multi-stages, additional electromagnetic valves are added. Referring to Taiwan Patent No. 200734807 and 200834808, a stepper motor is disclosed to control a multi-stage diaphragm. Only one electromagnetic valve is required to control opening and closing of the shutter. However, the conventional shutter devices still have a complex structure. Furthermore, the stepper motor is large and costly. Taiwan Patent No. 200734787 discloses a special hollow stepper motor to control a multi-stage diaphragm and a shutter. Thus, the structure is simplified, but the shutter device is also large and costly.

BRIEF SUMMARY OF THE INVENTION

The present invention provides a shutter device with a multi-stage diaphragm having a simple structure and low cost.

The shutter device with a multi-stage diaphragm includes a base, a shutter unit, a driving unit, and an actuator unit. The base includes a first optical opening defining an optical axle passing through the first optical opening. The shutter unit is pivoted on the base and adjusted to cover the first optical opening. The driving unit includes a main axle perpendicular to the optical axle and installed on the base, and a driving bar moving along the main axle and linking to the shutter unit. The actuator unit includes a coil board installed on one of the base and the driving bar, and an actuator magnet installed on the other of the base and the driving bar corresponding to the coil board.

The present invention provides signals to be inputted to the coil board to change the relative positions of the coil with pattern and the actuator magnet, resulting in the actuator unit driving the shutter unit in multi-stages.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Objectives of the present invention will become obvious to those of ordinary skill in the art after reading the following detailed description of the preferred embodiments that are illustrated in the various figures and drawings. Note that similar elements are labeled by the same reference numbers in the following description.

Figure 1:
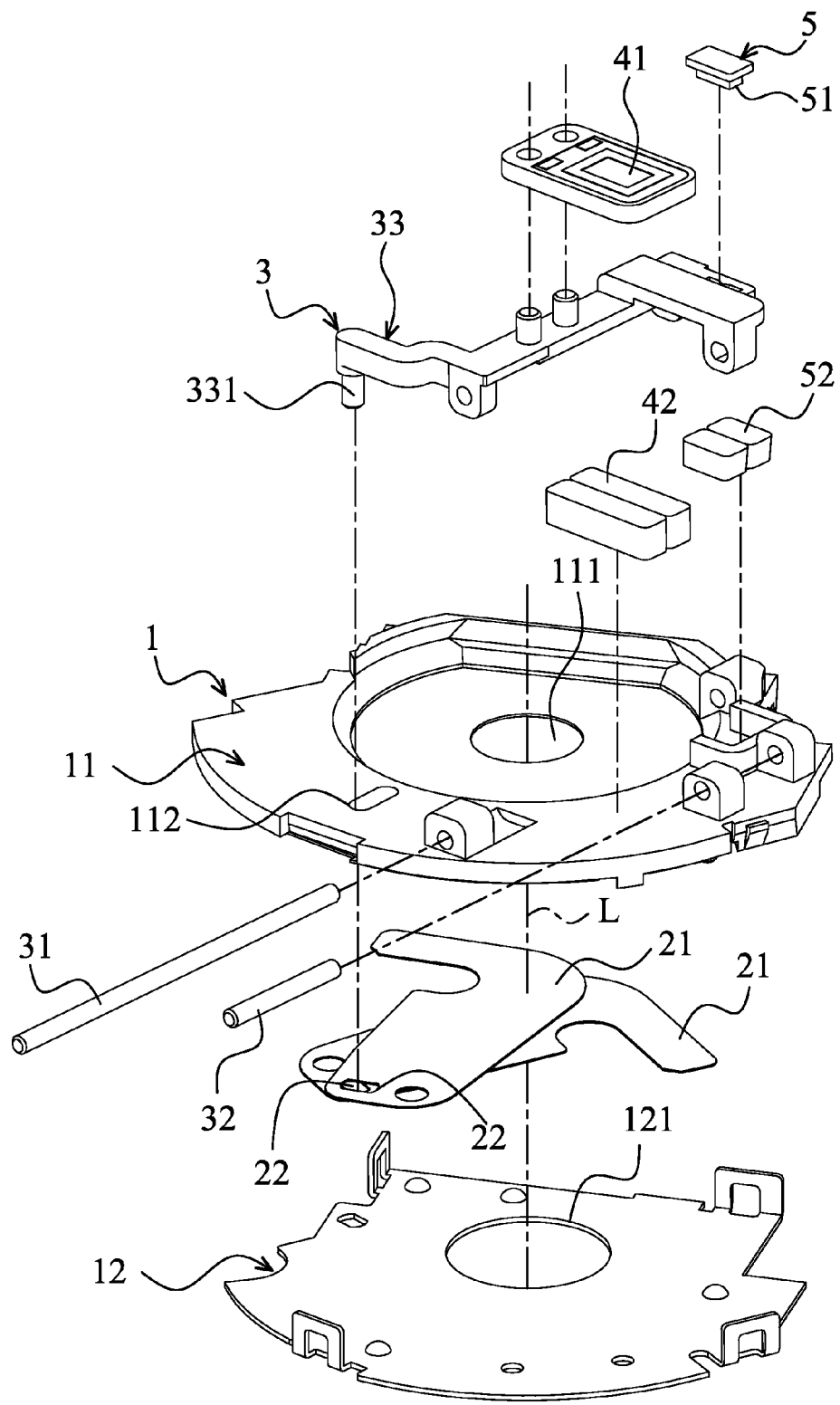
FIG. 1 is an exploded view of a shutter device with a multi-stage diaphragm of an embodiment of the present invention.
Figure 2:
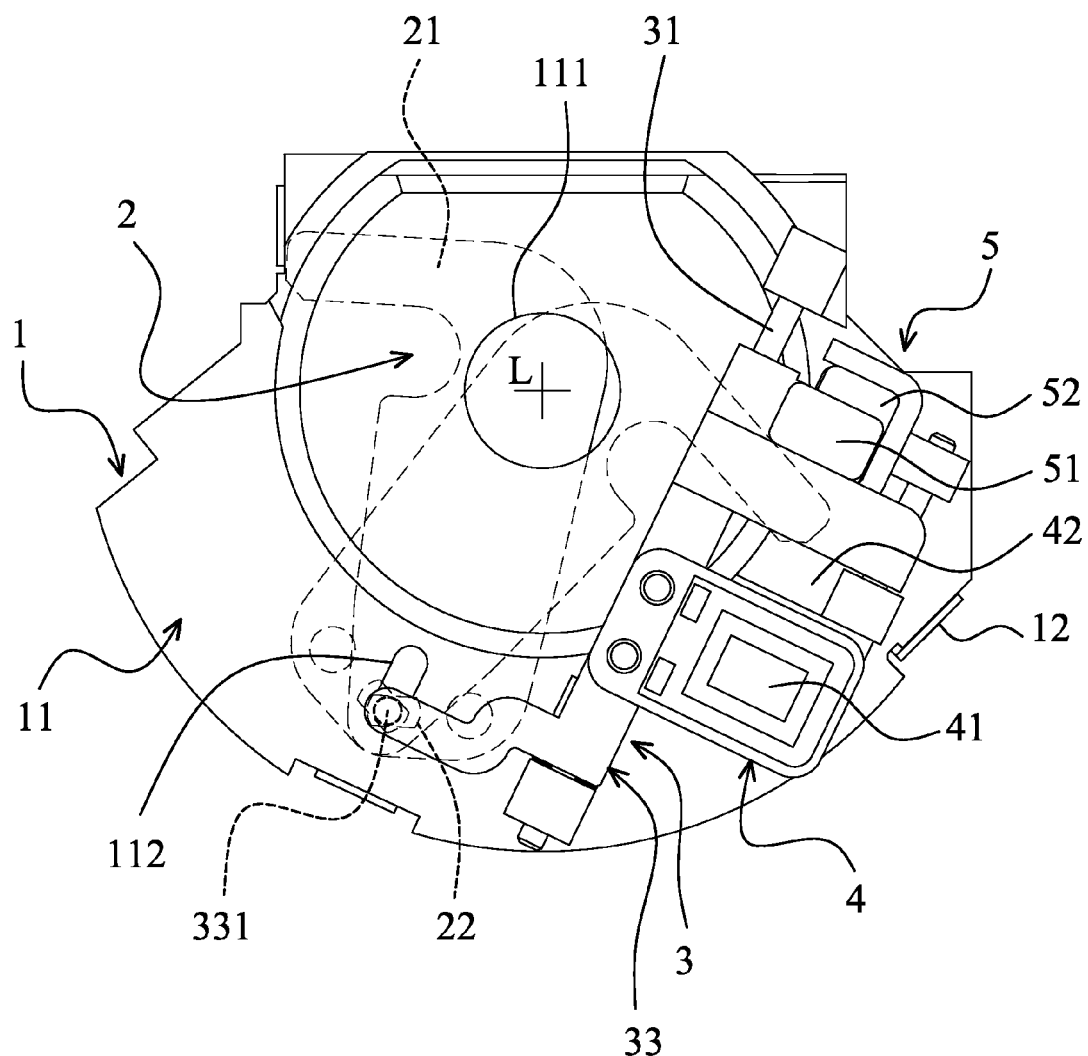
FIG. 2 is a front view showing the assembly relationship of a shutter device with a multi-stage diaphragm of an embodiment of the present invention.

Please refer to FIGS. 1 and 2, wherein a shutter device with a multi-stage diaphragm of an embodiment of the invention comprises a base 1, a shutter unit 2, a driving unit 3, an actuator unit 4 and an inspecting unit 5.

The base 1 comprises a main body 11, and a blade plate 12 installed on a bottom surface of the main body 11. The main body 11 comprises a first optical opening 111 and a through hole 112 to define an optical axle L to pass through the first optical opening 111. The blade plate 12 comprises a second optical opening 121 corresponding to the first optical opening 111.

The shutter unit 2 pivots on the base 1 and is adjusted to cover the first optical opening 111. The shutter unit 2 comprises two blades 21 that may pivot on the base 1 and the blade plate 12, and two grooves 22 respectively installed on the blades 21. The blades are rotated to change the size of the first optical opening 111. Note that the amount of blades 21 (not shown) for the shutter unit 2 may be different, according to requirements.

The driving unit 3 comprises a main axle 31 perpendicular to the optical axle L, installed on the base 1, a secondary axle 32 spaced at an interval corresponding to the first axle 31, and a driving bar 33 that moves along the main axle 31 and secondary axle 32. The driving bar 33 is attached to the shutter unit 2 for rotation. The driving bar 33 comprises a linking pin 331 inserted into the grooves 22 and the through hole 112.

The actuator unit 4 comprises a coil board 41 installed on the driving bar 33 and an actuator magnet 42 installed on the base 1 corresponding to the coil board 41.

The inspecting unit 5 comprises an inspecting element 51 installed on the driving bar 33 and a trigger element 52 installed on the base 1 corresponding to the inspecting element 51. In this embodiment, the inspecting element 51 comprises a Hall element and the trigger element 52 comprises a magnet. Note that the inspecting unit 5 may utilize optical elements (not shown) for inspection.

Figure 3:
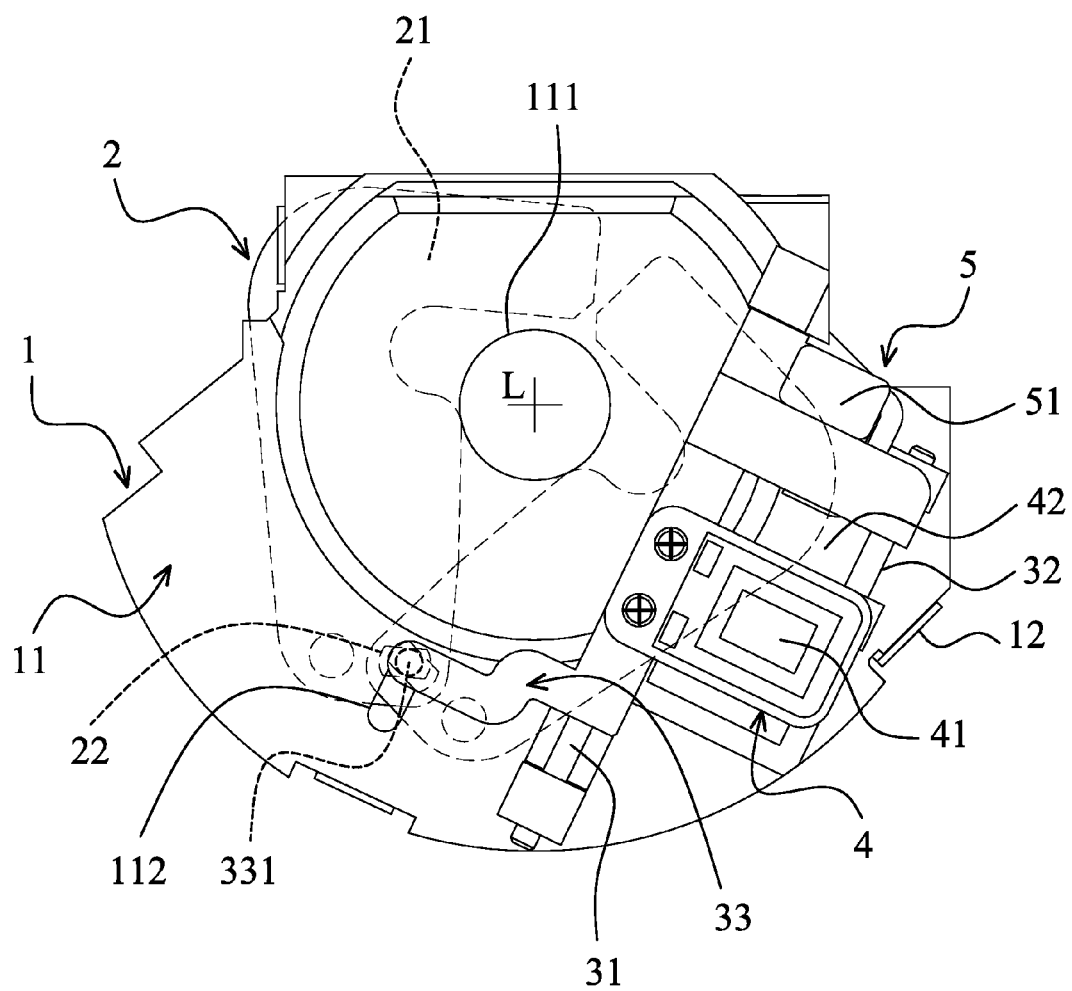
FIG. 3 is a front view showing a shutter device with a multi-stage diaphragm of an embodiment of the present invention in a large diaphragm state.

Referring to FIGS. 2 and 3, signals are received by the coil board 41 of the actuator unit 4, generating displacement between the coil board 41 and the actuator magnet 42. The inspecting unit 5 inspects if the actuator unit 4 has arrived at a determined position. At this time, the coil board 41 links with the driving bar 33 to slide along the main axle 31, and further, the linking pin 331 drives the grooves 22 to make the blades 21 rotate corresponding to the first optical opening 111 for closing the shutter.

Figure 4:
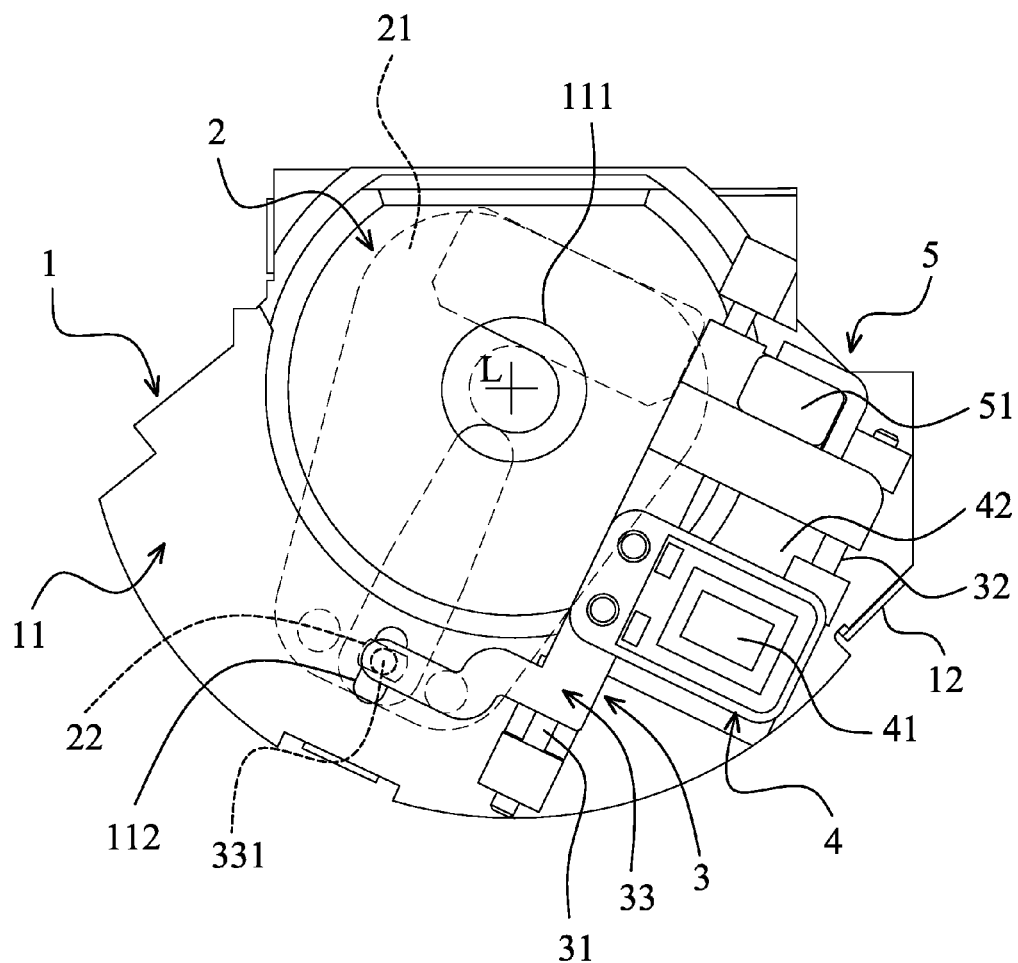
FIG. 4 is a front view showing a shutter device with a multi-stage diaphragm of an embodiment of the present invention in a smaller diaphragm state than that in FIG. 3.
Figure 5:
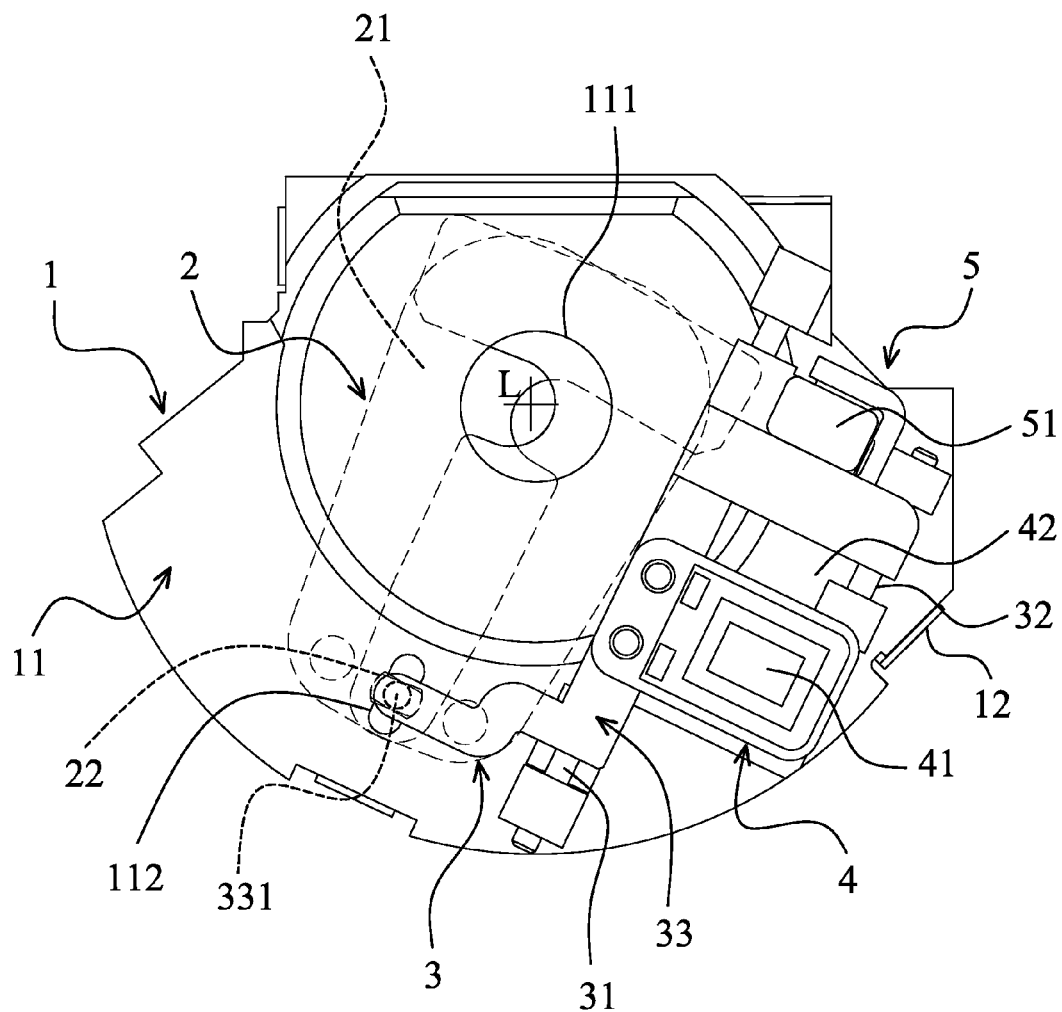
FIG. 5 is a front view showing a shutter device with a multi-stage diaphragm of an embodiment of the present invention in a smaller diaphragm state than that in FIG. 4.

Referring to FIGS. 3 to 5, due to the relative positions between the coil board 41 and the actuator magnet 42 controlled by the signals, the blades 21 can be adjusted multi-stages. FIG. 3 shows a large diaphragm state of the shutter unit. The diaphragm state in FIG. 4 is less than that in FIG. 3. The diaphragm state in FIG. 5 is less than that in FIG. 4.

Figure 6:
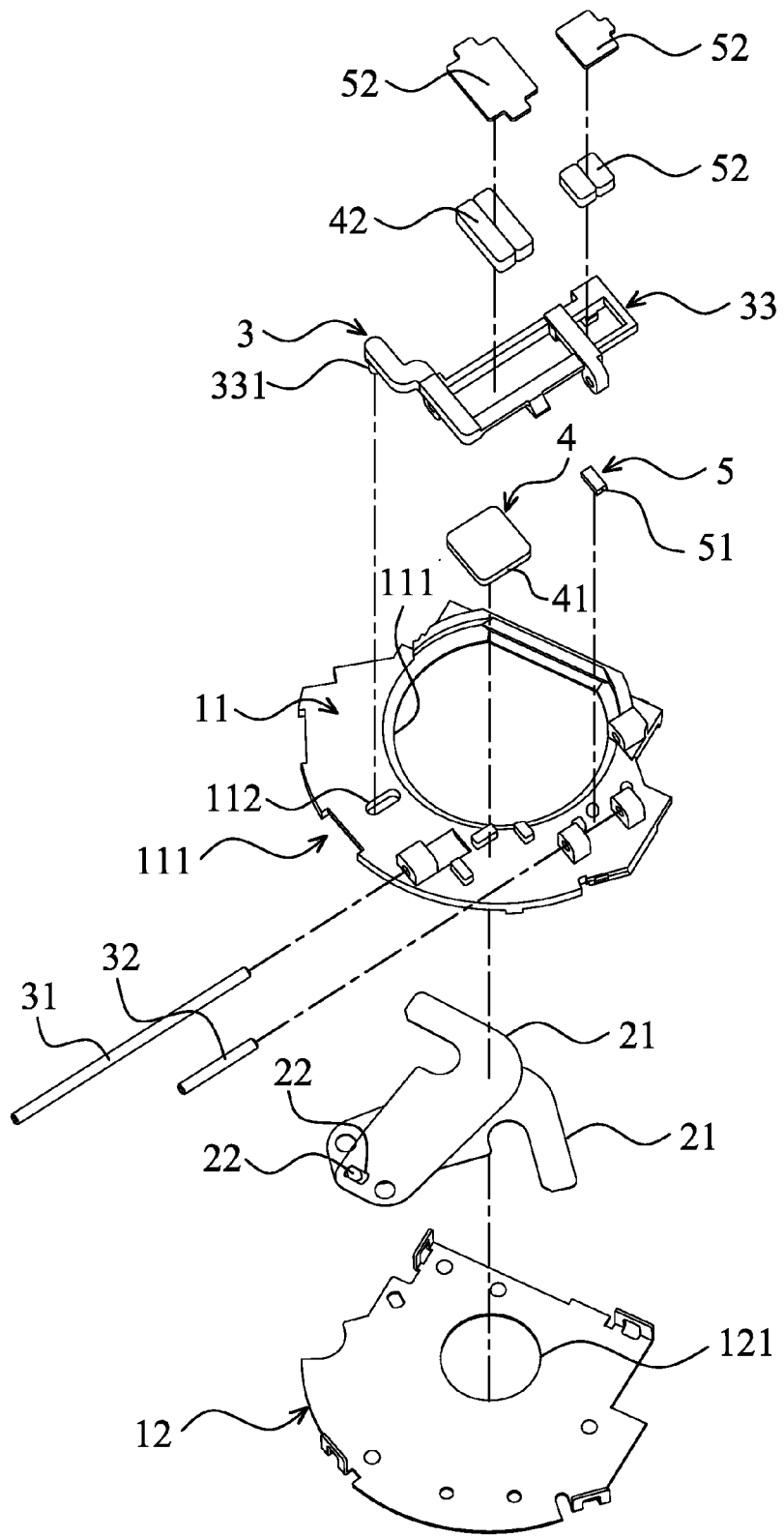
FIG. 6 is an exploded view of a shutter device with a multi-stage diaphragm of an embodiment of the present invention.
Figure 7:
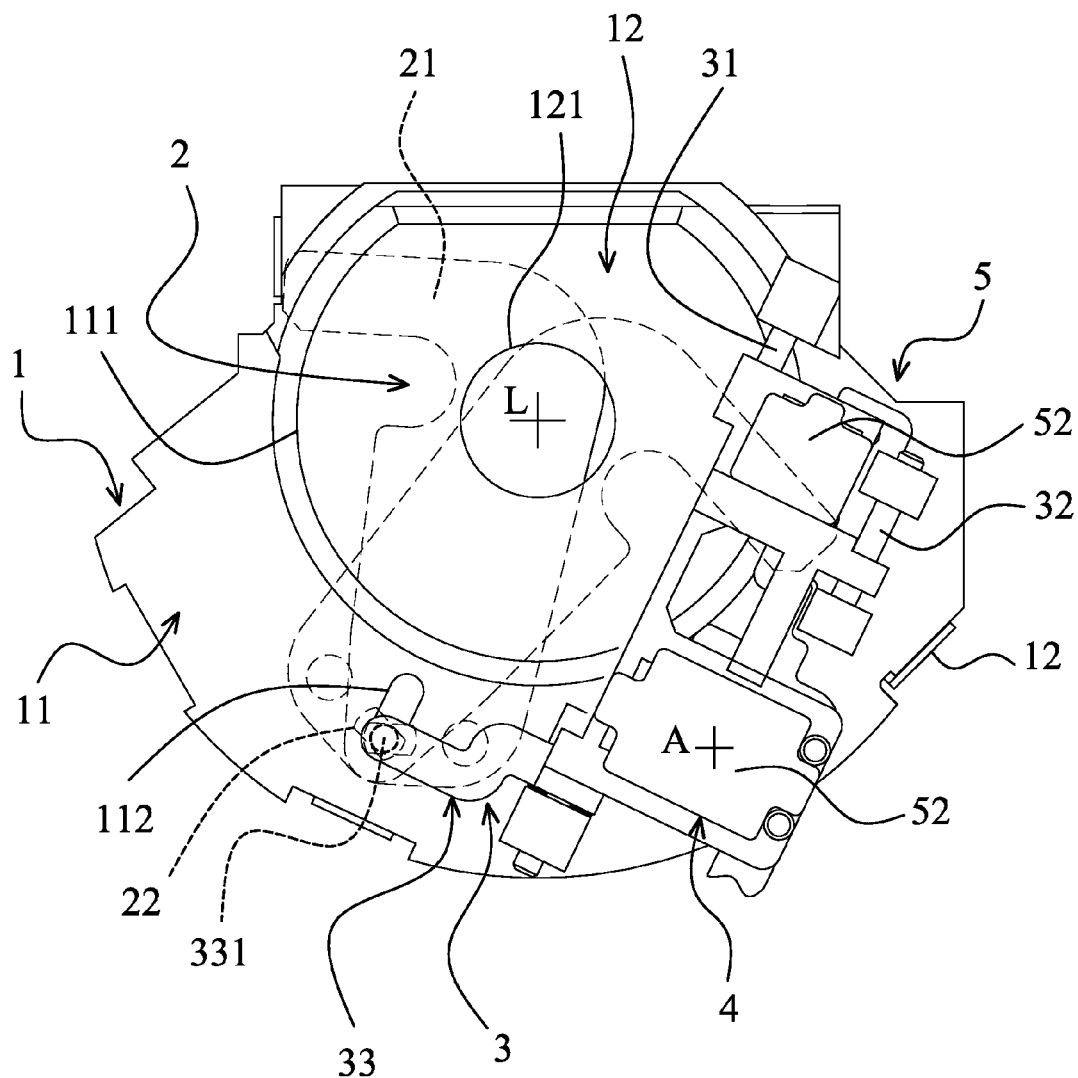
FIG. 7 is a front view showing the assembly relationship of a shutter device with a multi-stage diaphragm of an embodiment of the present invention.

Referring to FIGS. 6 and 7, the structure of this embodiment is approximately similar to that of the above embodiment. The difference is that the coil board 41 of the actuator unit 4 and the inspecting element 51 of the inspecting unit 5 are assembled on the base 1. The actuator magnet 42 and the trigger element 52 are assembled on the driving bar 33. A normal line A is defined to pass through the coil board 41 and the actuator magnet 42.

The direction of the normal line A is parallel to the optical axle L. That is, the actuator unit 4 is parallel to the base 1. The coil board 41 is disposed between the base 1 and the actuator magnet 42.

Because the coil board 41 is disposed on the base 1, the bus (not shown) connected to the coil board 41 is easily assembled.

Figure 8:
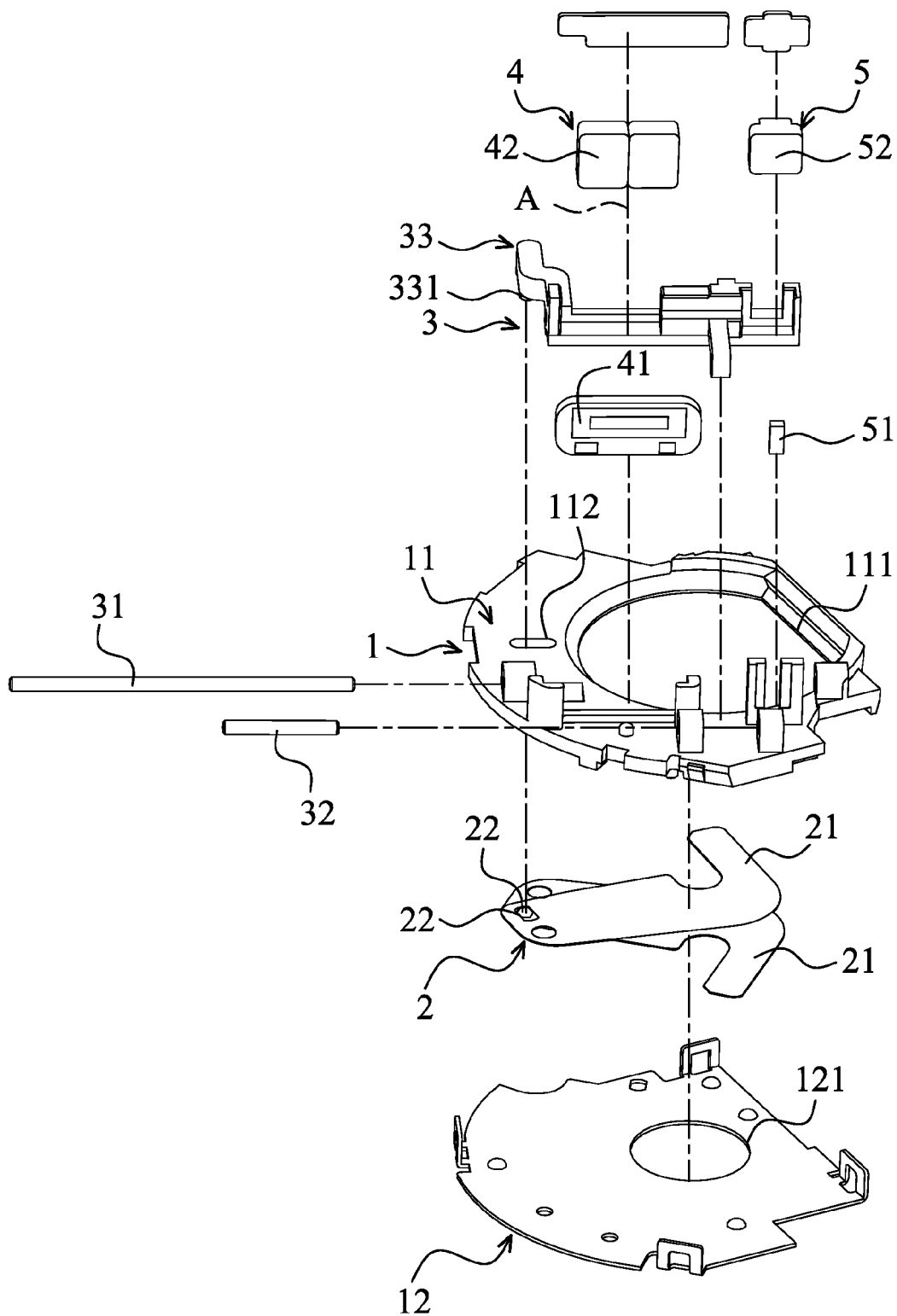
FIG. 8 is an exploded view of a shutter device with a multi-stage diaphragm of an embodiment of the present invention.
Figure 9:
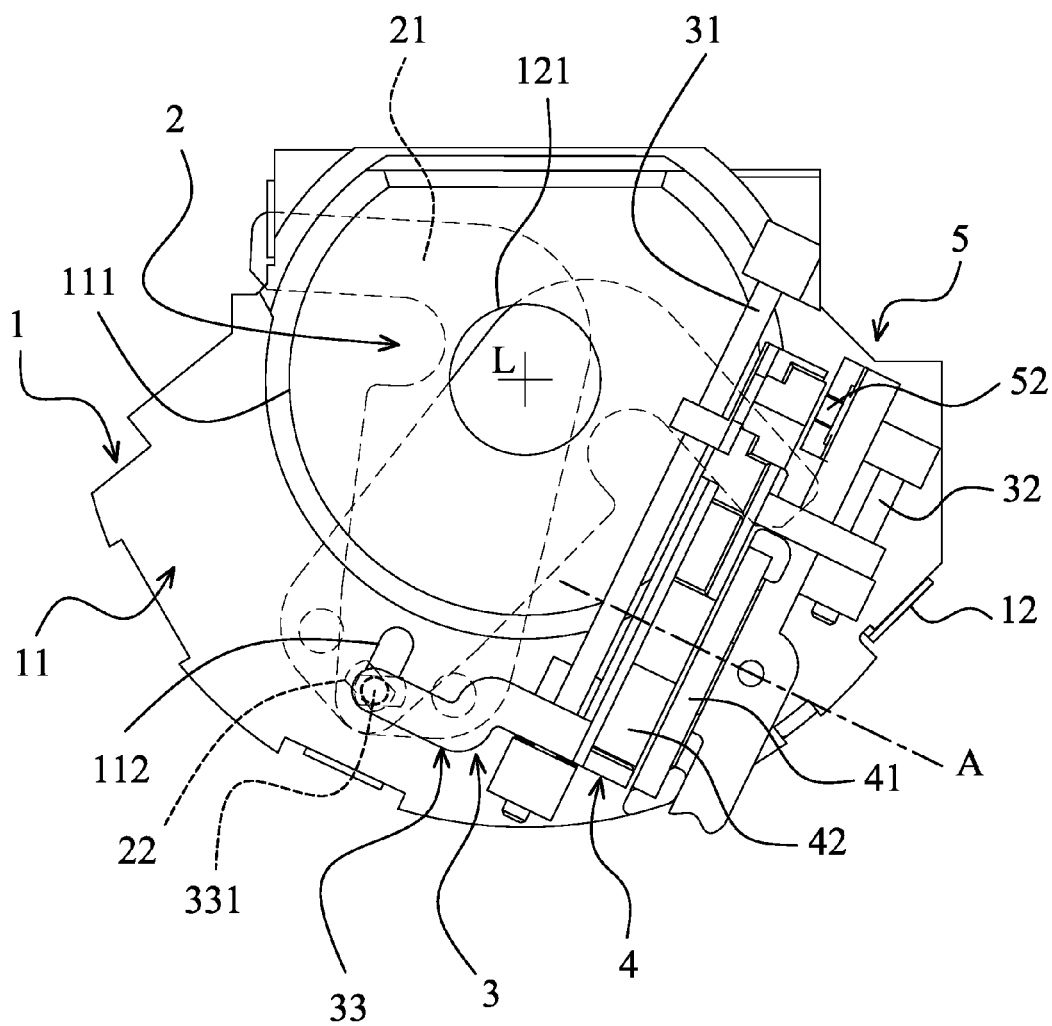
FIG. 9 is a front view showing the assembly relationship of a shutter device with a multi-stage diaphragm of an embodiment of the present invention.

Referring to FIGS. 8 and 9, the shutter device with a multi-stage diaphragm of this embodiment is similar to that of the former embodiment. The difference is that the direction of the normal line A is perpendicular to the optical axle L. That is, the actuator unit 4 is perpendicular to the base 1. In this embodiment, the actuator magnet 42 is installed between the first optical opening 111 and the coil board 41.

In summary, the shutter device with a multi-stage diaphragm of this invention utilizes the coil board 41 and the actuator magnet 42 to drive the blades 21 for rotation. Because the relative position of the actuator magnet 42 is controlled by electronic signals inputted to the coil board 41, a multi-stage adjustable shutter is achieved. Moreover, the coil board 41 and the actuator magnet 42 can replace the motor or the electromagnetic valve to control the blades 21 for rotation, thus, reducing cost and simplifying the structure.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A shutter device with a multi-stage diaphragm, comprising:
   a base, comprising a first optical opening to definite an optical axle to pass through the first optical opening;
   a shutter unit, pivoted on the base and adjusted to cover the first optical opening;
   a driving unit, comprising a main axle perpendicular to the optical axle and installed on the base, and a driving bar to move along the main axle and to link with the shutter unit; and
   an actuator unit, comprising a coil board installed on one of the base and the driving bar, and an actuator magnet installed on the other of the base and the driving bar corresponding to the coil board.

2. The shutter device with a multi-stage diaphragm as claimed in claim 1, further comprising:
   an inspecting unit, comprising an inspecting element installed on one of the base and the driving bar, and a trigger element installed on the other of the base and the driving bar corresponding to the inspecting element.

3. The shutter device with a multi-stage diaphragm as claimed in claim 2, wherein the inspecting element comprises a Hall element, and the trigger element comprises a magnet.

4. The shutter device with a multi-stage diaphragm as claimed in claim 2, wherein the shutter unit comprises two blades pivoted on the base and two grooves respectively installed on the blades, and the driving unit drives a linking pin inserted into the grooves.

5. The shutter device with a multi-stage diaphragm as claimed in claim 4, wherein the base comprises a main body and a blade plate installed on a bottom surface of the main body, the main body comprises the first optical opening and a through hole, and the blade plate comprises a second optical opening corresponding to the first optical opening.

6. The shutter device with a multi-stage diaphragm as claimed in claim 4, wherein the coil board of the actuator unit is installed on the driving bar, and the actuator magnet is installed on the base.

7. The shutter device with a multi-stage diaphragm as claimed in claim 4, wherein the coil board of the actuator unit is installed on the base, and the actuator magnet is installed on the driving bar to define a normal line to pass through the coil board and the actuator magnet.

8. The shutter device with a multi-stage diaphragm as claimed in claim 7, wherein the normal line is parallel to the optical axle, and the actuator unit is parallel to the base.

9. The shutter device with a multi-stage diaphragm as claimed in claim 7, wherein the normal line is perpendicular to the optical axle, and the actuator unit is perpendicular to the base.

10. The shutter device with a multi-stage diaphragm as claimed in claim 1, wherein the driving unit further comprises a secondary axle, the first axle and the secondary axle are spaced at an interval, and the driving bar is installed on and moves along the first axle and the secondary axle.

* * * * *